(12) United States Patent
Palit (10) Patent No.: US 7,246,035 B1
(45) Date of Patent: Jul. 17, 2007

(54) MULTI-FRAME SAMPLING SYSTEM AND METHOD FOR STATISTICAL ANALYSIS

(76) Inventor: Charles D. Palit, 933 University Bay Dr., Madison, WI (US) 53705

( * ) Notice: Subject to any disclaimer, the term of this patent is extended or adjusted under 35 U.S.C. 154(b) by 0 days.

(21) Appl. No.: 11/331,871

(22) Filed: Jan. 13, 2006

(51) Int. Cl.
 *G06F 15/00* (2006.01)
 *G06F 17/18* (2006.01)

(52) U.S. Cl. ..................................... 702/179

(58) Field of Classification Search ............... 702/179
 See application file for complete search history.

(56) References Cited

U.S. PATENT DOCUMENTS 7,058,638 B2 * 6/2006 Singh ......................... 707/100

OTHER PUBLICATIONS

Hartley, Multiple Frame Surveys, 1962, American Statistical Association, pp. 203-206.*
American Statistical Association, H.O. Hartley, Multiple Frame Surveys, Proceedings of the Social Statistics Section, pp. 203-206, 1962, Washington, D.C.
American Statistical Association, Robert M. Groves & James M. Lepkowski, An Experimental Implementation of a Dual Frame Telephone Sample Design, Proceedings of the Survey Research Methods Section, pp. 340-345, 1986, Washington, D.C.
American Statistical Association, William F. McCarthy & David V. Bateman, The Use of Mathematical Programming for Designing Dual Frame Surveys, Proceedings of the Survey Research Methods Section, pp. 652-653, 1988, Washington, D.C.
John Wiley & Sons, Ltd., T. Ezzati, et al., A dual frame design for sampling elderly minorities and persons with disabilities, Stat Med. Mar. 15-Apr. 15, 1995; 14(5-7):571-83, Hoboken, New Jersey.
Wikipedia, Sampling frame, Jun. 15, 2005, http://en.wikipedia.org/wiki/Sampling_frame.
Wikipedia, Sampling (statistics), Sep. 20, 2005, http://en.wikipedia.org/wiki/Sampling_(statistics).

* cited by examiner

*Primary Examiner*—Michael Nghiem
*Assistant Examiner*—Cindy Khuu
(74) *Attorney, Agent, or Firm*—Reinhart, Boerner, Van Deuren s.c.

(57) ABSTRACT

A system and method of multi-frame sampling for statistical analysis employs an estimator that may be generalize to two or more overlapping sampling frames. The estimator is accurate and requires less information and may be implemented more efficiently than previously known systems and methods. A generic computer system may be programmed to implement and employ the multi-frame sampling algorithms of the invention. Such algorithms may be employed to perform a statistical analysis on sample population data from multiple sample frames as stored in one or more databases accessible by the computer system.

8 Claims, 3 Drawing Sheets

MULTI-FRAME SAMPLING SYSTEM AND METHOD FOR STATISTICAL ANALYSIS

FIELD OF THE INVENTION

The present invention pertains generally to systems and methods for conducting statistical analyses and, more particularly, to systems and methods for sampling, wherein multiple data sources or sampling frames are employed.

BACKGROUND OF THE INVENTION

Sampling is that part of statistical practice concerned with the selection of individual observations intended to yield some knowledge about a population of concern, especially for purposes of statistical inference. The source from which a sample is drawn is called a sampling frame. A sampling frame is a collection of data, it is a list of (or a means of listing) all those within a population who can be sampled. In defining the frame, practical, economic, ethical and technical issues may need to be addressed.

Having established a sampling frame, there a number of ways to organize it to improve efficiency and effectiveness. In a simple sampling case, all elements of the frame are treated equally and it is not subdivided or partitioned. A sampling method is applied to the whole frame. Where the population embraces a number of distinct categories, the frame can be organized by these categories into separate strata or demographics. A sampling method is then applied to each stratum separately. Major gains in efficiency (either lower sample size or higher precision) can be achieved by varying the sampling fraction from stratum to stratum. Some general rules are: the sample sizes could be made proportional to the stratum standard deviation or variance and strata should be chosen to have means which differ substantially from one another. Where items in the population are clustered, sampling can reflect this to minimize costs and/or for ease of data collection. For example, a simple random sample of telephone calls is difficult to obtain from a telephone exchange, but it is easy to take a sample of customer lines and observe all of the calls on the sampled lines. That is, calls are naturally clustered by lines. The sample units within clusters tend to be more similar than randomly chosen sample units and thus clustering requires larger sample sizes to compensate for this reduction in the amount of information per sample element.

In any of the types of sample frames identified, a variety of sampling methods can be employed, individually or in combination. In probability sampling, for example, every combination of items from the frame or stratum has a known probability of occurring, but these probabilities are not necessarily equal. A common example of a probability sample is a random sample. In any form of sampling there is a risk that the sample will not adequately represent the population, but with probability sampling there is a large body of statistical theory which quantifies the risk and thus enables an appropriate sample size to be chosen. Furthermore, once the sample has been taken the sampling error associated with the measured results can be computed. With non-random sampling there is no measure of the associated sampling error. While such methods may be cheaper, this is largely meaningless since there is no measure of quality. There are several forms of probability sampling. For example, in simple random sampling, each element has an equal probability of occurring. This may be infeasible in many practical situations. Other examples of probability sampling include proportionate stratified sampling, disproportionate stratified random sampling and multistage sampling. Some probability samples do not have good methods of measuring quality. For example, selecting every tenth name from the telephone directory is simple to implement and is an example of systematic sampling. Though simple to implement, asymmetries and biases in the structure of the data can lead to bias in results. It is a type of probability sampling, but does not have a good way of measuring quality unless the directory itself is randomized before selection. Mechanical sampling occurs in sampling solids, liquids and gases, using collection devices such as grabs, scoops, probes, etc. Mechanical sampling is not random unless the material being sampled is known to be randomized. In many applications the sampler makes an assumption that the material sampled is randomized, and it is in fact a type of non-probability sampling. Care is needed to insure that the sample is representative of the frame. Sometimes called grab sampling, convenience sampling is the method of choosing items arbitrarily and in an unstructured manner from the population. Though almost impossible to treat rigorously, it is the method commonly employed in many practical situations.

Multiple data sources are sometimes available as potential sampling frames for population surveys, in some situations the use of a multiple frame sample design is more advantageous than using a single sampling frame. For example, one often finds that any one frame by itself may be inadequate to completely cover all units (households, persons, etc.) in the target population. It has been found that by overlapping a list frame and an area frame, for example, more complete coverage of the target population may be insured. For example, dual frame sample designs are appropriate for situations in which the target population densely populates one incomplete frame but forms only a minority of elements in another complete frame. The use of multiple sampling frames, however, has variance and bias implications, as well as sampling, data collection, and logistical considerations.

Figure 1:
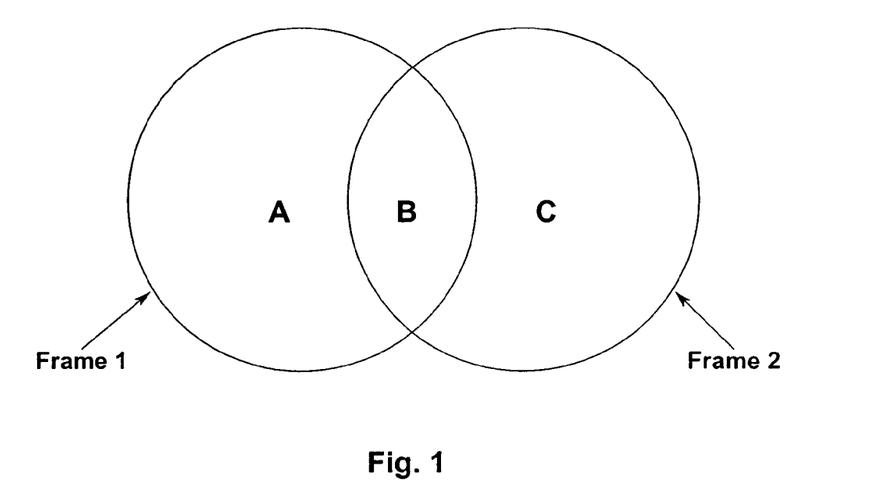
FIG. 1 is a schematic representation of a dual frame sample population wherein the two sampling frames overlap, as used to explain the operation of a multi-frame sampling system and method in accordance with the present invention.

A schematic representation of a dual framed sample is illustrated in FIG. 1. In this case, the population is defined by the contents of both Frame 1 and Frame 2. Note that if there is no overlap between Frame 1 and Frame 2 a simple stratified sampling model may be employed. However, in dual frame sampling the two different frames may overlap. That is, certain elements of the universal population encompassed by the two frames may be in both frames. For example, as illustrated in FIG. 1, we may see that there are three subsets of the universal sampled population, population A, which is found only in Frame 1, population B, which is found in both Frame 1 and Frame 2, and population C, which is found only in Frame 2. In order to obtain an accurate analysis using such a dual frame sample the sample data must be weighted appropriately. Such weighting may be used to obtain a weighted estimate which takes into account the overlap of the sample frames.

An estimator for a population parameter, such as the population total of both frames of a dual frame sample was presented by H. O. Hartley in 1962 as follows:

$$\tilde{X}_{pop} = \tilde{X}_{frame1\ only} + P\tilde{X}_{frame\ overlap} + Q\tilde{X}_{frame2only} \qquad (1)$$

where P+Q=1. P is the proportion of Frame 1 which overlaps with Frame 2.

$\tilde{X}$ is an estimator for a population parameter such as the population total. In this case we can think of this overlapping dual frame sample as four samples. A sample from A from Frame 1, a sample from B from Frame 1, a sample from B from Frame 2, and a sample from C from Frame 2.

The estimator developed by Hartley has several limitations. This estimator requires the determination of a parameter that is presumed to be the proportion of Frame 2 that is in Frame 1. However, determining such a value can be problematic and often the best that can be used is a good guess. Thus, the accuracy of the estimator is limited. Furthermore, the estimator has not been generalized to more than two sample frames.

What is desired, therefore, is an improved system and method for multi-frame sampling for statistical analysis. In particular, what is desired is a system and method that employs an improved estimator that is applicable to dual and multiple frame samples, and that is more accurate and efficient than current systems and methods employing known estimators.

SUMMARY OF THE INVENTION

The present invention provides a system and method of employing multi-frame sampling for statistical analysis. The present invention employs an estimator that may be generalized to two or more overlapping sampling frames. The estimator may be used to weight the sample data or records from the multiple frames. The present invention requires less information to provide an accurate estimator, and may be implemented more efficiently than previously known systems and methods.

In a multiple (k) frame design each frame consists of a set of population elements. Elements in one frame may also occur in any of the other frames. This overlap structure (which can be clearly seen in a Venn diagram) can be used to partition the population to be sampled into a number of unique subsets defined in terms of which frames the elements of the subset have membership. These unique subsets are disjoint. Each population element can belong to one and only one of these subsets. Some examples of these subsets are: The subset of population elements which occur only in frame 1. The subset of population elements which occur in frame 1 and also occur in frame 2 but in no other frames. The subset of population elements which occur in frame 2 and also in frame 3 but in no other frames. The subset of population elements which occur in frame 1, also occur in frame 2, and also occur in frame 3, but in no other frames. Etc.

In accordance with the present invention independent probability samples are selected from each frame. A disjoint subset's total for an attribute or variable value is estimated by dividing the value of the variable for each element in the sample by the sum of the frame selection probabilities for that element and then taking the sum of this quantity for all elements in the subset's sample. An estimate for the total for the variable for the entire population is the sum of the estimated totals for the disjoint subsets defined by the frame overlaps.

The present invention may be implemented in a generic computer system that is programmed to employ the multi-frame sampling algorithms described herein. In particular, such a system may calculate the estimators described herein and apply the result as a weighting to the multi-frame sample data to obtain a more accurate statistical analysis result. Such algorithms may be employed to perform a statistical analysis on sampling frame data from multiple sample frames as stored in one or more databases accessible by the computer system.

Further objects, features, and advantages of the present invention will be apparent from the following detailed description, taken in conjunction with the accompanying drawings.

DETAILED DESCRIPTION OF THE INVENTION

The present invention will be described first generically with respect to an inventive view of dual and multiple frame estimation in accordance with the present invention. A more specific example of the application of such an estimation for multi-frame sampling in accordance with the present invention then will be presented. The present invention may be implemented as a computer based process in a programmable computer system, as also will be described in more detail herein.

A dual frame estimator in accordance with the present invention will first be described generically with reference to the dual frame population illustrated in FIG. 1. As discussed above, in this case the two sample frames, Frame 1 and Frame 2, divide the universe of population elements into three disjoint sets of elements. Elements A are all population elements found in Frame 1 only. Elements B are all population elements which occur in both Frame 1 and Frame 2. Elements C are all population elements found in Frame 2 only. Each element has an attribute or variable value that is the subject of statistical analysis of the population.

Looking at the groups of elements A, B, and C as separate strata or subsets, the samples from each of the two frames can be used to give independent samples for each stratum or subset. For example, take one sample from A, two samples from B, and one sample from C for a total of four samples. Each sample delivers one estimate for its parent stratum or subset. For simplicity, consider the case where the selection probability is a constant within each frame, but allowed to vary between frames. From these four samples four independent estimates can be produced $X_{1A}$, $X_{1B}$, $X_{2B}$, $X_{2C}$. There are two estimates for the elements B, one from each frame. These can be combined into one estimate, $X_{12}$, and produce an estimate of the population total with:

$$X = X_{1A} + X_{12} + X_{2C}$$

where $X_{12} = (w_{1B} X_{1B} + w_{2B} X_{2B})$, and $w_{1B} + w_{2B} = 1$ \qquad(2)

The weighting variables $w_{1B}$ and $w_{2B}$ are chosen to make both quantities proportional to the selection probabilities of the Frame 1 sample and the Frame 2 sample respectively. Let $\pi_1$ be the selection probability used for Frame 1 and let $\pi_2$ be the selection probability used for Frame 2. Then the estimate $X_{12}$ becomes:

$$X_{12} = (\pi_1/(\pi_1+\pi_2))X_{1B} + (\pi_2/(\pi_1+\pi_2))X_{2B}$$

where $$(\pi_1/(\pi_1+\pi_2)) + (\pi_2/(\pi_1+\pi_2)) = 1. \quad (3)$$

If the estimator for $X_{1B}$ is:

$$\sum_{j=1}^{n_{1B}} x_{1Bj}/\pi_1, \quad (4)$$

where x is the attribute or variable value of the $j^{th}$ sample, the familiar Horvitz-Thompson estimator, then:

$$(\pi_1/(\pi_1+\pi_2))X_{1B} = (\pi_1/(\pi_1+\pi_2))\sum_{j=1}^{n_{1B}} x_{1Bj}/\pi_1 \quad (5)$$

$$= \sum_{j=1}^{n_{1B}} x_{1Bj}/(\pi_1+\pi_2)$$

Similarly, the estimator $X_{2B}$ is:

$$X_{2B} = \sum_{j=1}^{n_{2B}} x_{2Bj}/\pi_2 \quad (6)$$

And so the estimator $X_{12}$ becomes:

$$X_{12} = \sum_{j=1}^{n_{1B}} x_{1Bj}/(\pi_1+\pi_2) + \sum_{j=1}^{n_{2B}} x_{2Bj}/(\pi_1+\pi_2). \quad (7)$$

Thus, using Horvitz-Thompson estimates similar to Equation 4 for $X_{1A}$ and $X_{2C}$, the estimator of Equation 2

$$(X = X_{1A} + X_{12} + X_{2C})$$

becomes:

$$X = \sum_{j=1}^{n_{1A}} x_{1Aj}/\pi_1 + \sum_{j=1}^{n_{1B}} x_{1Bj}/(\pi_1+\pi_2) + \sum_{j=1}^{n_{2B}} x_{2Bj}/(\pi_1+\pi_2) + \sum_{j=1}^{n_{2C}} x_{2Cj}/\pi_2 \quad (8)$$

Figure 2:
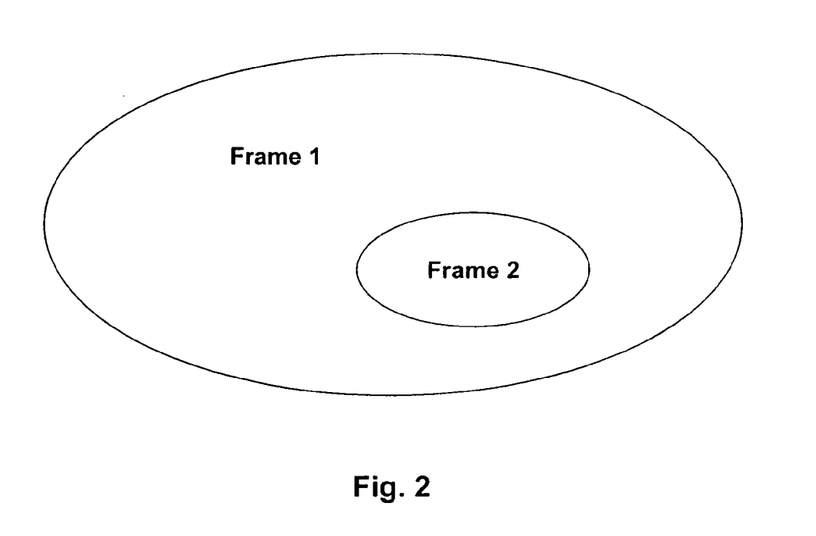
FIG. 2 is a schematic representation of an alternative dual frame sample population with which the present invention may be employed.

Now a simpler case of nested dual frame samples is considered. In this case, as illustrated in FIG. 2, sampling Frame 1 includes the entirety of sampling Frame 2. This can be viewed as a two strata problem for which there are three samples. As before, B is used to denote the overlapping part of the two frames, and A to denote the part of Frame 1 which is not included in Frame 2. One sample comes from the part of Frame 1 which is disjoint from Frame 2. As before, we will call the estimate based on this sample $X_{1A}$. The other two samples come from Frame 2. One sample is the part of the sample drawn from Frame 1 which lies in Frame 2, and the other sample is the sample drawn only from Frame 2. In this case, however, where there is no portion of the population that is in Frame 2 but not in Frame 1, an estimate of the whole population can be written as $X_{1A} + X_{12}$ where, as above:

$$X_{12} = (w_{1B}X_{1B} + w_{2B}X_{2B}) \text{ and } w_{1b} + w_{2B} = 1. \quad (9)$$

And the estimator becomes:

$$X = \sum_{j=1}^{n_{1A}} x_{1Aj}/\pi_1 + \sum_{j=1}^{n_{1B}} x_{1Bj}/(\pi_1+\pi_2) + \sum_{j=1}^{n_{2B}} x_{2Bj}/(\pi_1+\pi_2) \quad (10)$$

Figure 3:
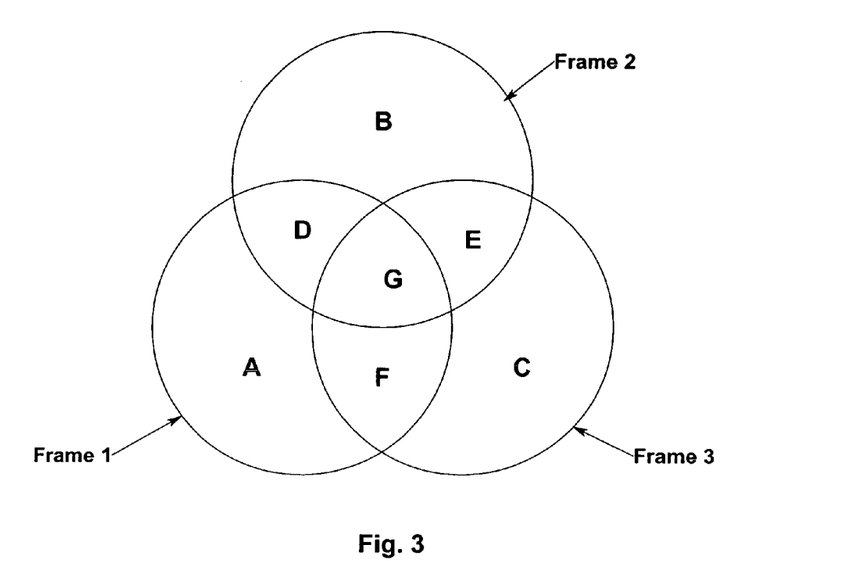
FIG. 3 is a schematic representation of a multi-frame sample population with which a multi-frame sampling system and method in accordance with the present invention may be employed.

The approach described can be extended to multi-frame sampling schemes where k>2 sampling frames are used. For example, a schematic representation of a sample population using three sampling frames, Frame 1, Frame 2, and Frame 3 is illustrated in FIG. 3. In the dual frame scheme the total population was partitioned into three strata or subsets. In the three frame design the universe may be partitioned into seven strata or subsets, as illustrated in FIG. 3. The strata A, B, and C each contain elements from only one frame. The elements in D are from Frame 1 and Frame 2. The elements E are from Frame 2 and Frame 3. The elements F are from Frame 1 and Frame 3. The elements G are from all three frames. We have already seen that the estimators for A, B, and C are of the form:

$$\sum_{j=1}^{n_{1A}} x_{1Aj}/\pi_1 \quad (11)$$

$$\sum_{j=1}^{n_{1B}} x_{2Bj}/\pi_2 \quad (12)$$

and $$\sum_{j=1}^{n_{1B}} x_{3Bj}/\pi_3, \quad (13)$$

and the estimators for D, E, and F are of the form:

$$\sum_{j=1}^{n_{1D}} x_{1Dj}/(\pi_1+\pi_2) + \sum_{j=1}^{n_{2D}} x_{2Dj}/(\pi_1+\pi_2) \quad (14)$$

$$\sum_{j=1}^{n_{2E}} x_{2Ej}/(\pi_2+\pi_3) + \sum_{j=1}^{n_{3E}} x_{3Ej}/(\pi_2+\pi_3) \quad (15)$$

$$\sum_{j=1}^{n_{1F}} x_{1Fj}/(\pi_1+\pi_3) + \sum_{j=1}^{n_{3F}} x_{3Fj}/(\pi_1+\pi_3) \quad (16)$$

The estimator for G is of the form:

$$\sum_{j=1}^{n1G} x_{1Gj}/(\pi_1+\pi_2+\pi_3) + \sum_{j=1}^{n2G} x_{2Gj}/(\pi_1+\pi_2+\pi_3) + \sum_{j=1}^{n3G} x_{3Gj}/(\pi_1+\pi_2+\pi_3) \quad (17)$$

where the weights are of the form: $\pi_i/(\pi_1+\pi_2+\pi_3)$ (18).

The general solution for a stratum containing all k frames is:

$$\sum_{i=1}^{k}\sum_{j=1}^{n_j} x_{ij} \Big/ \sum_{i=1}^{k} \pi_i. \quad (19)$$

Where $X_{ij}$ are the observations from the stratum. Adding the estimators for all the strata (e.g., A, B, C, D, E, F, and G) together produces the required estimate for the universe total.

Figure 4:
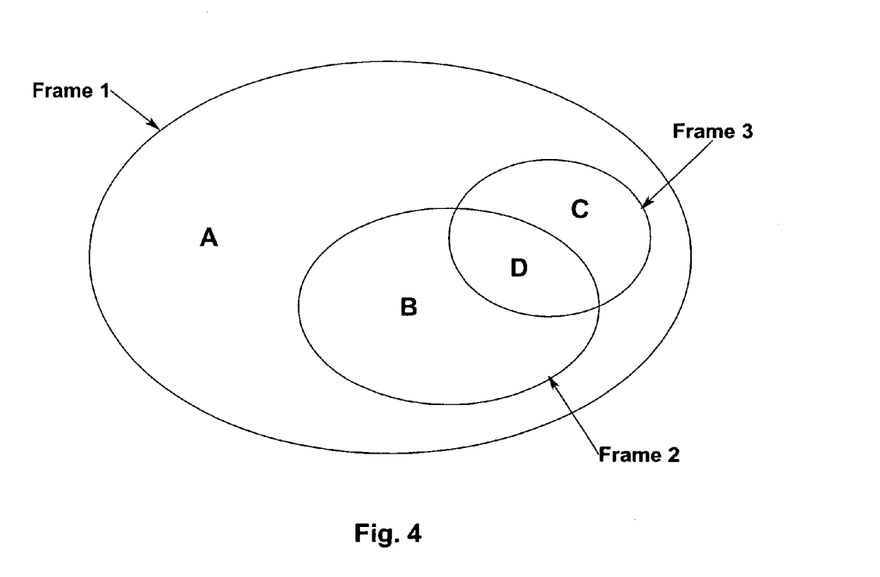
FIG. 4 is a schematic representation of an alternative multi-frame sample population with which a multi-frame sampling system and method in accordance with the present invention may be employed.

A specific exemplary application of a multi-frame sampling method in accordance with the present invention will now be presented. In this case, we begin with a three frame multi-frame sample. Frame 1 is a national random digit dial (RDD) sample, Frame 2 is an RDD sample of households with Hispanic surnames, Frame 3 is a Hispanic population list from another source. The relationship between these three frames is illustrated in FIG. 4.

The basic estimation tool used in each frame may be the Horvitz-Thompson estimator:

$$\hat{T} = \Sigma(t_i/\pi_i) \quad (20).$$

Where T is an estimate for the population total on the attribute T, $\pi_i$ is the probability the $i^{th}$ unit is selected into the final sample, and $t_i$ is the value of t for the $i^{th}$ sample unit. This is a common estimator. It is used in many surveys. It may be seen in an alternate form:

$$T = N\Sigma(t_i/(p_i/R)) \quad (21)$$

Where R is a measure of the response rate expressed as a proportion and $p_i$ is the probability with which the sampler selected the unit i from the sampling frame.

This estimation tool is very useful in the multi-frame sampling method of the present invention. If a random sample or other equal probability sample is selected from each frame and if the response rate is measured by frame then the corresponding record based design weights for each of the frame areas if simple random samples were employed would be:

| Area | Design Weight | (22) |
|---|---|---|
| A | $1/\pi_1$ | |
| B | $(1/(\pi_1+\pi_2))$ | |

-continued

| Area | Design Weight | (22) |
|---|---|---|
| C | $(1/(\pi_1+\pi_3))$ | |
| D | $(1/(\pi_1+\pi_2+\pi_3))$ | |

Where $\pi_i$ is the selection probability for elements from the $i^{th}$ frame i=1, 2, 3.

We will now consider this exemplary case where each frame uses a slightly different stratification scheme. In this case, each stratum within a frame may have a different selection probability and the within frame stratum for each frame may have a different value for response rate. In the example being presented, each of the frames has its own sample design. The national RDD sample frame is stratified by income and geography. The Hispanic RDD frame is stratified by Hispanic density geography. The Hispanic list frame is stratified by geography. The following tables illustrate the stratification scheme for each frame and the type of samples selected.

| Stratification for Frame 1 National RDD Frame | | | | |
|---|---|---|---|---|
| Assoc DMA | Hi Income | Medium Income | Low Income | Very Low Income |
| New York | Random Sample | Random Sample | Random Sample | Random Sample |
| Los Angeles | Random Sample | Random Sample | Random Sample | Random Sample |
| | Random Sample | Random Sample | Random Sample | Random Sample |
| | Random Sample | Random Sample | Random Sample | Random Sample |
| | Random Sample | Random Sample | Random Sample | Random Sample |
| San Francisco Balance | Random Sample | Random Sample | Random Sample | Random Sample |
| | Random Sample | Random Sample | Random Sample | Random Sample |

| Stratification for Frame 2 Hispanic RDD Frame | | | | |
|---|---|---|---|---|
| Assoc DMA | Hi Hispanic Density | Medium Hispanic Density | Low Hispanic Density | Very Low Hispanic Density |
| New York | Random Sample | Random Sample | Random Sample | Not Sampled |
| | Random Sample | Random Sample | Random Sample | Not Sampled |
| | Random Sample | Random Sample | Random Sample | Not Sampled |
| | Random Sample | Random Sample | Random Sample | Not Sampled |
| San Francisco Balance | Random Sample | Random Sample | Random Sample | Not Sampled |
| | Random Sample | Random Sample | Random Sample | Not Sampled |

| Stratification for Frame 3 Hispanic List Frame | |
|---|---|
| Strata | |
| New York | Random Sample |
| | Random Sample |
| | Random Sample |
| | Random Sample |
| San Francisco | Random Sample |
| Balance | Random Sample |

For each frame the selection probability is the same for all elements in a stratum. The selection probability does vary between strata. When the three frames are combined the boundaries of the frames solves the frame-stratum boundaries act to define a large number of cells for the composite frame.

For example, the New York high income stratum of the national RDD frame may have elements of all three frames. In which case four cells are created for the composite sample inside the New York high income stratum. (1) New York high income from area A, national RDD only. (2) New York high income from area B, national RDD and Hispanic RDD. (3) New York high income from area C, national RDD and Hispanic List. (4) New York high income from area D, national RDD, Hispanic RDD and Hispanic List. In this case, cell one has one sample. Cell two has two samples, one from the national RDD frame and one from the Hispanic RDD frame. Cell three has two samples, one from the national RDD frame and one from the Hispanic List frame. Cell four has three samples, one from the national RDD frame, one from the Hispanic RDD frame, and one from the Hispanic List frame. Thus the potential number of samples in the New York high income stratum is six.

The basic estimation tool used to estimate stratum totals for each of these six samples is the Horvitz-Thompson estimator adjusted for response rate:

$$T = N\Sigma(t_i/(p_i/R)) \quad (23)$$

Where R is a measure of the cell's response rate expressed as a proportion, and $p_i$ is the probability with which the sampler selected the unit i from the sampling frame, $t_i$ is the value of t for the $i^{th}$ sample element, and T is the estimated total value of t for all population elements in the cell. For simplicity this may be written as: $\hat{T} = \Sigma(t_i/\pi_i)$ (24)

Where again, T is an estimate for the cell total for the attribute t, $\pi_i$ is the probability $i^{th}$ is selected into the final sample adjusted for response rate, and $t_i$ is the value of t for the $i^{th}$ sample element.

For cell 1, with only one sample, the sample from the national RDD frame, the estimator for cell total is:

$$\hat{T} = \Sigma(t_j/\pi_i) \quad (25)$$

This implies that the record based weight for the $j^{th}$ sample unit is $(1/\pi_1)$.

For cell 2 or cell 3, which each have two different samples, the weighted average of the cells' two samples may be used to estimate the cell total for attribute t. The weighted estimator is:

$$(\pi_1/(\pi_1+\pi_2))\hat{T}_{S1} + (\pi_2/(\pi_1+\pi_2))\hat{T}_{S2} \quad (26)$$

where $T_{Si}$ is the Horvitz-Thompson estimate for the first sample, $T_{S2}$ is the estimate from the second sample, $\pi_1$ is the selection probability for the first sample and $\pi_2$ is the section probability for the second sample.

This expression simplifies to the sum for T over all units in both samples:

$$\sum_{s1 \text{ands}2} t_j/(\pi_1 + \pi_2) \quad (27)$$

where s1 and s2 are the two samples from the stratum. Here the record based weight is $1/(\pi_1+\pi_2)$.

In cell 4 three different samples have been selected, one from each frame. The weighted average for this cell's total is:

$$(\pi_1/(\pi_1+\pi_2+\pi_3))\hat{T}_{S1} + (\pi_2/(\pi_1+\pi_2+\pi_3))\hat{T}_{S2} + (\pi_2/(\pi_1+\pi_2+\pi_3))\hat{T} \quad (28)$$

This expression simplifies to the sum for t over all units in all three samples s1, s2, and s3 from the cell $$\sum_{s1,s2 \text{ands}3} t_j/(\pi_1 + \pi_2 + \pi_3) \quad (29)$$

and the record weight here is $1/(\pi_1+\pi_2+\pi_3)$.

If we shift perspective slightly we can write the estimate for the New York high income stratum as:

$$\sum_{s1,s2,s3,s4,s5,\text{ands}6} t_j/(\Pi_1 + \Pi_2 + \Pi_3) \quad (30)$$

where $\Pi_1 = \pi_1$ if $t_j \in$ National RDD Frame $\Pi_2 = \pi_2$ if $t_j \in$ Hispanic RDD Frame and 0 otherwise $\Pi_3 = \pi_3$ if $t_j \in$ Hispanic List Frame and 0 otherwise. (31)

The record level design rate for this estimator is:

$$1/(\Pi_1+\Pi_2+\Pi_3) \quad (32)$$

If the population count or estimated count for the stratum is available we can use an improved estimator $$\left(N_h \bigg/ \sum_{stratum} (1/(\Pi_1 + \Pi_2 + \Pi_3))\right) \sum_{stratum} (t_j/\Pi_1 + \Pi_2 + \Pi_3)) \quad (33)$$

The record level design weight for this estimator is:

$$\left(N_h \bigg/ \sum_{stratum} (1/(\Pi_1 + \Pi_2 + \Pi_3))\right) (1/\Pi_1 + \Pi_2 + \Pi_3)) \quad (34)$$

Figure 5:
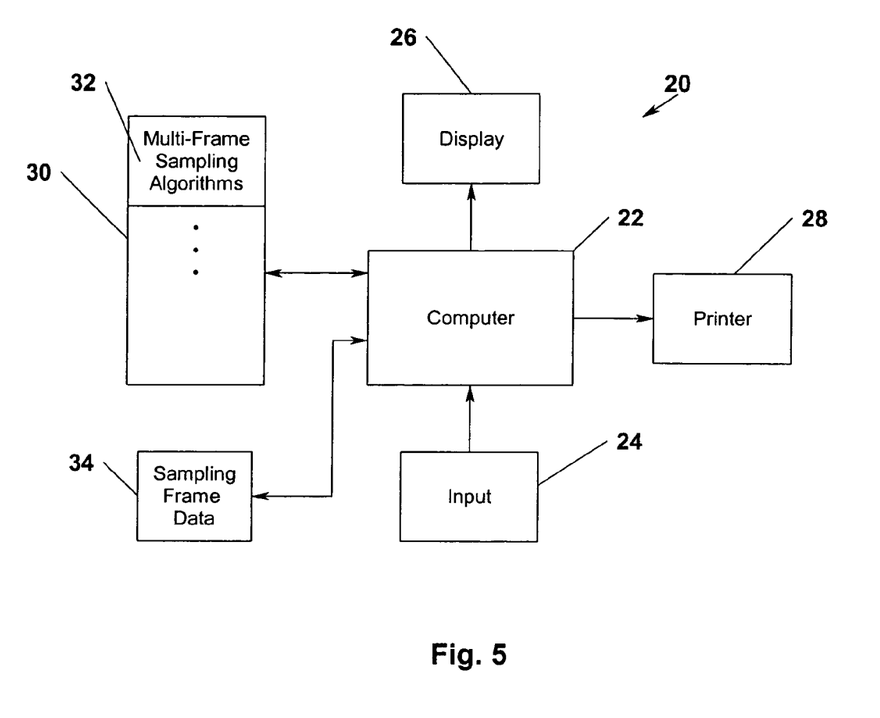
FIG. 5 is a schematic block diagram of a computer system in which a multi-frame sampling system and method for statistical analysis in accordance with the present invention may be implemented.

An exemplary computer implemented system 20 for implementing a multi-frame sampling system and method in accordance with the present invention is illustrated schematically in, and will be described with reference to, FIG. 5. The present invention may be implemented in any current or future general purpose computer system 22. It should be noted that the computer system 22 may be implemented as a single computer or multiple computers networked together. The operating speed and capacity of the computer selected to implement the present invention may be selected based on the particular statistical analyses to be performed and taking into account such considerations as the volume of data to be processed, acceptable run times, etc. Based on the detailed description provided herein a person of ordinary skill in the art of computer programming with respect to statistical analysis will be able to implement a method for multi-frame sampling in accordance with the present invention on a conventional computer system 22 running a conventional operating system and using conventional programming languages and techniques.

The computer system 22 in which a multi-frame sampling method in accordance with the present invention is implemented preferably includes conventional peripheral devices that provide for user interaction with the system 22. Such devices may include conventional input devices 24, such as a computer keyboard, mouse, track ball, light pen, and/or other currently known input devices. Conventional output devices such as a conventional computer display device 26 and printer 28 preferably also are provided as part of the system 20. Conventional programming techniques may be used to provide graphical or other user interfaces on the display device 26.

The computer system 22 preferably is provided with conventional program memory 30, e.g., ROM, disk memory, and/or other memory storage devices. One or more of the multi-frame sampling algorithms 32 described herein may be implemented in software and stored in memory 30 for access and use by a user via the computer 22 and input 24 and display 26 devices. Memory 30 may also contain various general purpose software programs for use by the computer system 22, such as conventional operating system software, as well as special purpose statistical analysis software programs, of which the multi-frame sampling algorithms 32 in accordance with the present invention may be a part or an addition.

As described herein, a multi-frame sampling system in accordance with the present invention may be used to provide improved statistical analysis of population data from multiple sampling frames. Such multiple sampling frame data 34 may be stored in an appropriate database accessible by the computer system, either as part of, or separate from, the system memory 30.

It should be understood that the present invention is not limited by the particular exemplary applications and embodiments illustrated and described herein, but encompasses all variations thereof as may come within the scope of the following claims.

What is claimed is:

1. A method for using multiple-sample frames in statistical analysis, comprising:
  (a) providing a population data set including a plurality of sample frames wherein each sample frame consists of a set of population elements, wherein each population element has a value, and wherein the plurality of sample frames overlap such that elements in one frame may also occur in any other frames such that the population to be sampled is partitioned into a plurality of unique disjoint subsets defined by in which frames the elements of the subset have membership;
  (b) selecting independent probability samples from each sample frame;
  (c) estimating a total for the element values of each disjoint subset by dividing the value for each element in the sample by the sum of frame selection probabilities for such element to obtain a result and then taking a sum of the result for all elements in the subset's sample;
  (d) deriving an estimate for the total for the value for the population as a sum of the estimated totals; and
  (e) storing the estimate for the total for the value for the population.

2. A method for using multiple-sampling frames in statistical analysis, comprising:
  (a) providing a population data set including a plurality of k sample frames wherein each sample frame consists of a set of population elements, wherein each population element has a value, and wherein the plurality of sample frames overlap such that elements in one frame may also occur in any other frames such that the population to be sampled is partitioned into a plurality of unique disjoint subsets defined by in which frames the elements of the subset have membership;
  (b) deriving an estimator for each subset of the form:

$$\sum_{i=1}^{k}\sum_{j=1}^{n_j} x_{ij} \Big/ \sum_{i=1}^{k} \pi_i,$$

where $x_{ij}$ are sampled element values from the subsets and $\pi_i$ is a selection probability used for the frame i;
  (c) deriving an estimator for the population as a sum of the estimators for each subset; and
  (d) storing the estimator for the population.

3. The method of claim 2 wherein k=2, wherein there are three subsets (A, B, and C) and wherein the estimator for the population is of the form:

$$X = \sum_{j=1}^{n1A} x_{1Aj}/\pi_1 + \sum_{j=1}^{n1B} x_{1Bj}/(\pi_1 + \pi_2) + \sum_{j=1}^{n2B} x_{2Bj}/(\pi_1 + \pi_2) + \sum_{j=1}^{n2C} x_{2Cj}/\pi_2.$$

4. The method of claim 2 wherein k=2 and wherein all of the elements of a one of the two sample frames is included in the other of the two sample frames such that there are two subsets (A and B) and wherein the estimator for the population is of the form:

$$X = \sum_{j=1}^{n1A} x_{1Aj}/\pi_1 + \sum_{j=1}^{n1B} x_{1Bj}/(\pi_1 + \pi_2) + \sum_{j=1}^{n2B} x_{2Bj}/(\pi_1 + \pi_2).$$

5. A computer implemented system for using multiple-sample frames in statistical analysis, comprising:
  (a) memory containing a population data set including a plurality of k sample frames wherein each sample frame consists of a set of population elements, wherein each population element has a value, and wherein the plurality of sample frames overlap such that elements in one frame may also occur in any other frames such that the population to be sampled is partitioned into a plurality of unique disjoint subsets defined by in which frames the elements of the subset have membership; and (b) a computer system coupled to the memory and adapted to derive an estimator for the population by selecting independent probability samples from each sample frame from the data set, estimating a total for the element values of each disjoint subset by dividing the value for each element in the sample by the sum of frame selection probabilities for such element to obtain a result and then taking a sum of the result for all elements in the subset's sample, deriving an estimate for the total for the value for the population as a sum of the estimated totals, and storing the estimate for the total for the value of the population in memory.

6. The system of claim 5 wherein the estimate for each subset is of the form:

$$\sum_{i=1}^{k}\sum_{j=1}^{n_j} x_{ij} \Big/ \sum_{i=1}^{k} \pi_i,$$

where $x_{ij}$ are sampled element values from the subsets and $\pi_i$ is a selection probability used for the frame i.

7. The system of claim 5 wherein k=2 and there are three subsets (A, B, and C) and wherein the estimate for the total for the value of the population is of the form:

$$X = \sum_{j=1}^{n1A} x_{1Aj}/\pi_1 + \sum_{j=1}^{n1B} x_{1Bj}/(\pi_1 + \pi_2) + \sum_{j=1}^{n2B} x_{2Bj}/(\pi_1 + \pi_2) + \sum_{j=1}^{n2C} x_{2Cj}/\pi_2.$$

8. The system of claim 5 wherein k=2 and wherein all of the elements of a one of the two sample frames is included in the other of the two sample frames such that there are two subsets (A and B) and wherein the estimate for the total for the value of the population is of the form:

$$X = \sum_{j=1}^{n1A} x_{1Aj}/\pi_1 + \sum_{j=1}^{n1B} x_{1Bj}/(\pi_1 + \pi_2) + \sum_{j=1}^{n2B} x_{2Bj}/(\pi_1 + \pi_2).$$

* * * * *